US012132633B1

(12) United States Patent
Zahavi (10) Patent No.: US 12,132,633 B1
(45) Date of Patent: Oct. 29, 2024

(54) BANDWIDTH EVALUATION IN A FAT-TREE NETWORK

(71) Applicant: MELLANOX TECHNOLOGIES, LTD., Yokneam (IL)

(72) Inventor: Eitan Zahavi, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/458,191

(22) Filed: Aug. 30, 2023

(51) Int. Cl.
*H04L 43/0882* (2022.01)
*H04L 45/48* (2022.01)

(52) U.S. Cl.
CPC .......... *H04L 43/0882* (2013.01); *H04L 45/48* (2013.01)

(58) Field of Classification Search
None
See application file for complete search history.

(56) References Cited

U.S. PATENT DOCUMENTS

| | | | | |
|---|---|---|---|---|
| 2014/0023084 A1* | 1/2014 | Goldenberg | .......... | H04L 5/0058 370/400 |
| 2014/0258479 A1* | 9/2014 | Tenginakai | ......... | H04L 41/0889 709/220 |
| 2014/0341225 A1* | 11/2014 | Subramanian | ........ | H04L 49/111 370/401 |
| 2015/0365325 A1* | 12/2015 | Hwang | .................. | H04L 47/70 370/230 |
| 2016/0099834 A1* | 4/2016 | Kim | ........................ | H04L 49/15 370/256 |
| 2021/0288921 A1* | 9/2021 | Levy | .................... | H04L 49/1515 |
| 2023/0179471 A1* | 6/2023 | Thubert | .............. | H04L 41/0668 370/221 |
| 2023/0353507 A1* | 11/2023 | Zahid | .................. | H04L 67/1001 |

OTHER PUBLICATIONS

Ohring et al., "On Generalized Fat Trees," Proceedings of the 9th International Parallel Processing Symposium, IEEE, pp. 37-44, Apr. 1995.
Zahavi et al., "Quasi Fat Trees for HPC Clouds and Their Fault-Resilient Closed-Form Routing," Proceedings of the IEEE 22nd Annual Symposium on High-Performance Interconnects, pp. 1-9, Aug. 2014.

(Continued)

*Primary Examiner* — Joshua Joo
(74) *Attorney, Agent, or Firm* — MEITAR PATENTS LTD.

(57) ABSTRACT

A system for bandwidth estimation includes an interface and a processor. The interface communicates with a fat-tree (FT) network including multiple switches including (i) leaf switches belonging to a bottom level, (ii) spine switches belonging to a top level and (iii) intermediate switches belonging to one or more intermediate levels. Links connect between selected ones of the switches. The processor is to calculate, for a given level of the FT network that is divided into multiple groups of switches, oversubscription ratios for the respective groups, an oversubscription ratio of a group being indicative of a ratio between (i) a first available bandwidth on the links connecting the switches in the group to a lower level, and (ii) a second available bandwidth on the links connecting the switches in the group to a higher level, and to report a figure of merit of the FT network based on the oversubscription ratios.

12 Claims, 4 Drawing Sheets

(56) References Cited

OTHER PUBLICATIONS

Leiserson, "Fat-Trees: Universal Networks for Hardware-Efficient Supercomputing," IEEE Transactions on Computers, vol. C-34, No. 10, pp. 892-901, Oct. 1985.
Dally et al., "Principles and Practices of Interconnection Networks," Morgan Kaufmann Publishers, Elsevier, Inc., pp. 1-581, year 2004.
Duato et al., "Interconnection Networks: An Engineering Approach," Morgan Kaufmann Publishers, Elsevier Science (USA), pp. 1-625, year 2003.
Wikipedia, "Dinic's algorithm," pp. 1-4, last edited Jul. 19, 2023.
Dinic, "Algorithm for Solution of a Problem of Maximum Flow in a Network with Power Estimation," Doklady Akademii Nauk, SSSR, vol. 11, No. 5, pp. 1277-1280, year 1970.

\* cited by examiner

BANDWIDTH EVALUATION IN A FAT-TREE NETWORK

FIELD OF THE INVENTION

The present invention relates generally to data communication networks, and particularly to methods and systems for evaluation of available bandwidth in Fat-Tree (FT) networks.

BACKGROUND OF THE INVENTION

Fat-Tree (FT) is a network topology that is widely used in data centers and other data communication networks. The FT topology was first described by Leiserson in "Fat-Trees: Universal Networks for Hardware-Efficient Supercomputing," IEEE Transactions on Computers, Volume C-34, Issue 10, October, 1985.

A generalized form of the FT topology is described by Ohring et al., in "On Generalized Fat Trees," Proceedings of the $9^{th}$ International Parallel Processing Symposium, Santa Barbara, California, April, 1995. Another class of FT topologies, referred to as Quasi Fat Tree (QFT), is described by Zahavi et al., in "Quasi Fat Trees for HPC Clouds and Their Fault-Resilient Closed-Form Routing," Proceedings of the IEEE $22^{nd}$ Annual Symposium on High-Performance Interconnects," Mountain View, California, August, 2014.

SUMMARY OF THE INVENTION

An embodiment of the present invention that is described herein provides a system for bandwidth estimation. The system includes an interface and a processor. The interface is to communicate with a fat-tree (FT) network including a plurality of switches including (i) multiple leaf switches belonging to a bottom level, (ii) multiple spine switches belonging to a top level and (iii) multiple intermediate switches belonging to one or more intermediate levels between the top level and the bottom level. Multiple links connect between selected ones of the switches. The processor is to calculate, for a given level of the FT network that is divided into multiple groups of switches, one or more oversubscription ratios for one or more of the groups, respectively, an oversubscription ratio of a group being indicative of a ratio between (i) a first available bandwidth on the links connecting the switches in the group to a lower level, and (ii) a second available bandwidth on the links connecting the switches in the group to a higher level, and to report a figure of merit of the FT network based on the oversubscription ratios.

In some embodiments, the processor is to approximate the oversubscription ratio of a given group by calculating a ratio between (i) a first number of operational links connecting the switches in the given group to the lower level, and (ii) a second number of operational links connecting the switches in the given group to the higher level.

In a disclosed embodiment, the given level is an intermediate level immediately above the leaf level. In an example embodiment, each of the groups, together with the leaf switches connected thereto, forms a bipartite network. In an embodiment, the FT network includes multiple bottom-to-top sub-trees each extending from a respective leaf switch toward the top level, and each group includes the switches in the given level that belong to a same bottom-to-top sub-tree. In various embodiments, the processor is to report one or more of (i) a maximum of the oversubscription ratios, (ii) a minimum of the oversubscription ratios and (iii) an average of the oversubscription ratios.

There is additionally provided, in accordance with an embodiment described herein, a method for bandwidth estimation in a fat-tree (FT) network that includes a plurality of switches. The switches include (i) multiple leaf switches belonging to a bottom level, (ii) multiple spine switches belonging to a top level, and (iii) multiple intermediate switches belonging to one or more intermediate levels between the top level and the bottom level. The FT network further includes multiple links connecting between selected ones of the switches. The method includes, for a given level of the FT network that is divided into multiple groups of switches, calculating one or more oversubscription ratios for one or more of the groups, respectively, an oversubscription ratio of a group being indicative of a ratio between (i) a first available bandwidth on the links connecting the switches in the group to a lower level, and (ii) a second available bandwidth on the links connecting the switches in the group to a higher level, and reporting a figure of merit of the FT network based on the oversubscription ratios.

The present invention will be more fully understood from the following detailed description of the embodiments thereof, taken together with the drawings in which:

DETAILED DESCRIPTION OF EMBODIMENTS

Overview

A Fat-Tree (FT) network comprises multiple switches and multiple communication links that connect the switches to one another. The switches are arranged in levels, including a leaf level (also referred to as a bottom level), a spine level (also referred to as a top level), and optionally one or more intermediate levels. The switches of the leaf level, spine level and intermediate levels are referred to herein as leaf switches, spine switches and intermediate switches, respectively. Hosts served by the FT network are typically connected to the switches of the leaf level.

Various flavors of the classic FT topology have been formulated and used, including the generalized FT and Quasi-FT topologies, cited above. In the context of the present disclosure and in the claims, the term "FT network" refers broadly to classic FT and to any variant thereof.

Links in a FT network may become faulty over the network's lifetime. In the present context, the term "faulty link" refers to a link that is unable to transfer data at the link's specified bandwidth and quality. A link may fail for various reasons, e.g., due to a defective cable or switch port.

The embodiments described herein refer mainly to complete failures, i.e., to faults that reduce the link bandwidth to zero. The disclosed techniques, however, can also be used with faults that degrade the link performance but still retain some available bandwidth.

It is important to note that the mere number of faulty links does not fully describe the actual impact of the faulty links on the network's performance. In other words, a certain number of faulty links have a tolerable effect or a severe effect on the network, depending on where the failures occur in the network topology. Understanding the impact of the faulty links on the main figures of merit of the network enables improved network management. For example, maintenance operations, e.g., replacements of faulty links, can be prioritized correctly. As another example, processing tasks ("jobs") can be assigned to hosts while considering the actual impact of the faulty links. As yet another example, alerts triggered by faulty links can be filtered and/or assigned different severities depending on the actual severity of the faults.

Embodiments that are described herein provide methods and systems for assessing the actual impact of faulty links on the performance of a FT network. The disclosed techniques are typically carried out by a Network Management System (NMS) that is coupled to the network.

Consider a group of switches in a certain intermediate level of a FT network. The switches in the group are connected to the next-higher level (the spine level or another intermediate level) via multiple links referred to as "upward links". In addition, the switches in the group are connected to the next-lower level (the leaf level or another intermediate level) via multiple links referred to as "downward links".

In the present context, the leaf level (bottom level) is also considered as having both upward links and downward links. The upward links of the leaf level are the links that connect to the intermediate level immediately above the leaf level. The downward links of the leaf level are the links that connect the leaf switches to the hosts served by the network. In other words, the hosts can be viewed as an additional level that is hierarchically below the leaf level. Terms such as "up", "upwards" and "higher" mean "toward the top level". Terms such as "down", "downwards" and "lower" mean "toward the bottom level", or more generally "away from the top level".

At a certain point in time, one or more of the upward links and/or one or more of the downward links may fail. A faulty upward link reduces the total available upward bandwidth. A faulty downward link reduces the total available downward bandwidth. The impact of a certain constellation of faulty links can be quantified by the ratio between (i) the total available bandwidth on the upward links of the group and (ii) the total available bandwidth on the downward links of the group. This ratio is referred to herein as the "oversubscription ratio" of the group. When the level in question is divided into multiple groups of switches, the set of oversubscription ratios of the groups provide a simple yet effective metric of the actual impact of the faulty links on the network performance.

In some embodiments, the NMS comprises an interface for communicating with the switches of the FT network, and a processor that carries out the methods described herein. The processor receives from the switches information indicating which links are functional (operational) and which links are faulty. For a given level (intermediate or leaf level) whose switches are divided into groups, the processor calculates one or more oversubscription ratios for one or more of the groups, respectively, and reports one or more figures-of-merit of the network based on the one or more calculated oversubscription ratios. Figures-of-merit may comprise, for example, a maximum, a minimum and/or an average of the oversubscription ratios, taken over the groups of a given level. In some embodiments, two or more levels, and possibly all levels except for the spine level, can be analyzed in this manner to provide richer information.

Various example implementations of the disclosed techniques are described herein. For example, in some embodiments the processor approximates the oversubscription ratio of a group by calculating the ratio between the number of functional (operational) upward links and the number of functional downward links. This approximation assumes that all the links have equal bandwidths.

The level being evaluated can be divided into groups in various ways. In one example, the level is the intermediate level immediately above the leaf level. Each group is chosen such that the switches in the group, together with the leaf switches they are connected to, form a bipartite network. In another example, the FT network can be viewed as comprising a plurality of bottom-to-top sub-trees each extending from a respective leaf switch toward the spine level. The level being evaluated is partitioned into groups such that each group comprises the switches that belong to the same bottom-to-top sub-tree.

System Description

Figure 1:
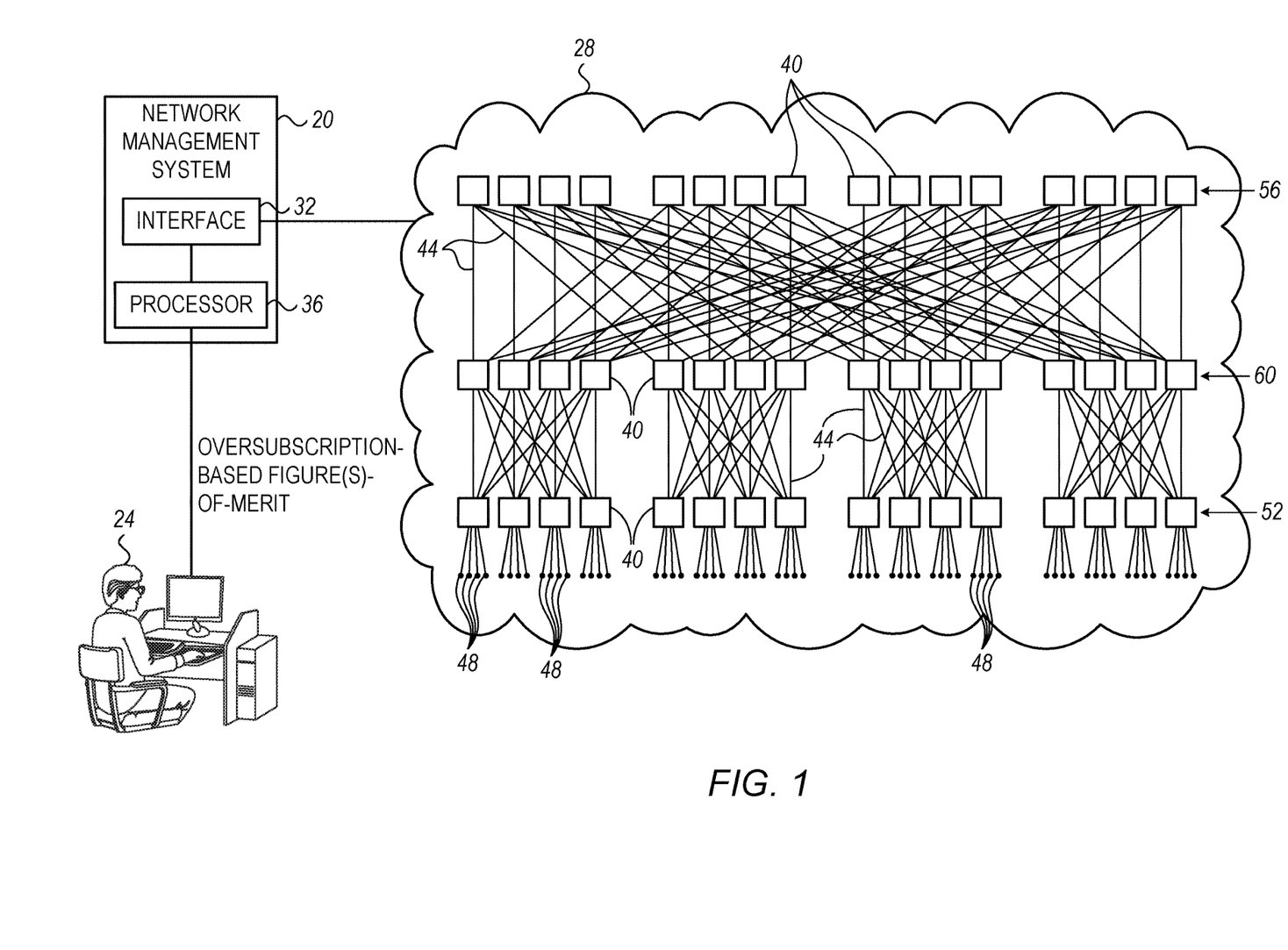
FIG. 1 is a block diagram that schematically illustrates a Network Management System (NMS) that manages a Fat-Tree (FT) network, in accordance with an embodiment of the present invention.

FIG. 1 is a block diagram that schematically illustrates a Network Management System (NMS) 20 used by an operator 24 to manage a Fat-Tree (FT) network 28, in accordance with an embodiment of the present invention.

Network 28 may comprise, for example, a data center, a High-Performance Computing (HPC) cluster, or any other suitable type of network. Network 28 may operate in accordance with any suitable network protocol, e.g., Ethernet or InfiniBand™ (IB).

In the example of FIG. 1, NMS 20 comprises an interface 32 and a processor 36. Interface 32 communicates with network 28. Processor 36 carries out the various tasks of NMS 20. In particular, processor 36 assesses the network performance based on oversubscription ratios in accordance with the disclosed techniques.

Network 28 comprises multiple network switches 40 and multiple network links 44. Switches 40 may comprise, for example, layer-2 Ethernet or IB switches. Network links 44 may comprise, for example, electrical or optical cables. Each link 44 connects a port of one switch 40 to a port of another switch 40. Network 28 serves a plurality of hosts 48, e.g., servers or other computers.

In accordance with the FT topology, switches 40 of network 28 are arranged in multiple levels. The present example shows a three-level network comprising a leaf level 52 (also referred to as a bottom level), a spine level 56 (also referred to as a top level), and an intermediate level 60. Hosts 48 are connected to the switches in the leaf level. In alternative embodiments, network 28 may comprise multiple intermediate levels between the leaf level and the spine level.

The configurations of NMS 20 and network 28, as shown in FIG. 1, are example configurations that are chosen purely for the sake of conceptual clarity. In alternative embodiments, any other suitable configurations can be used. Elements that are not necessary for understanding the principles of the present invention have been omitted from the figures for clarity.

The various elements of NMS 20 and network 28 may be implemented in hardware, e.g., in one or more Application-Specific Integrated Circuits (ASICs) or FPGAs, in software, or using a combination of hardware and software elements. In some embodiments, processor 36 may be implemented, in part or in full, using one or more general-purpose processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Bandwidth Metrics Based on Oversubscription Ratios

Figure 2A:
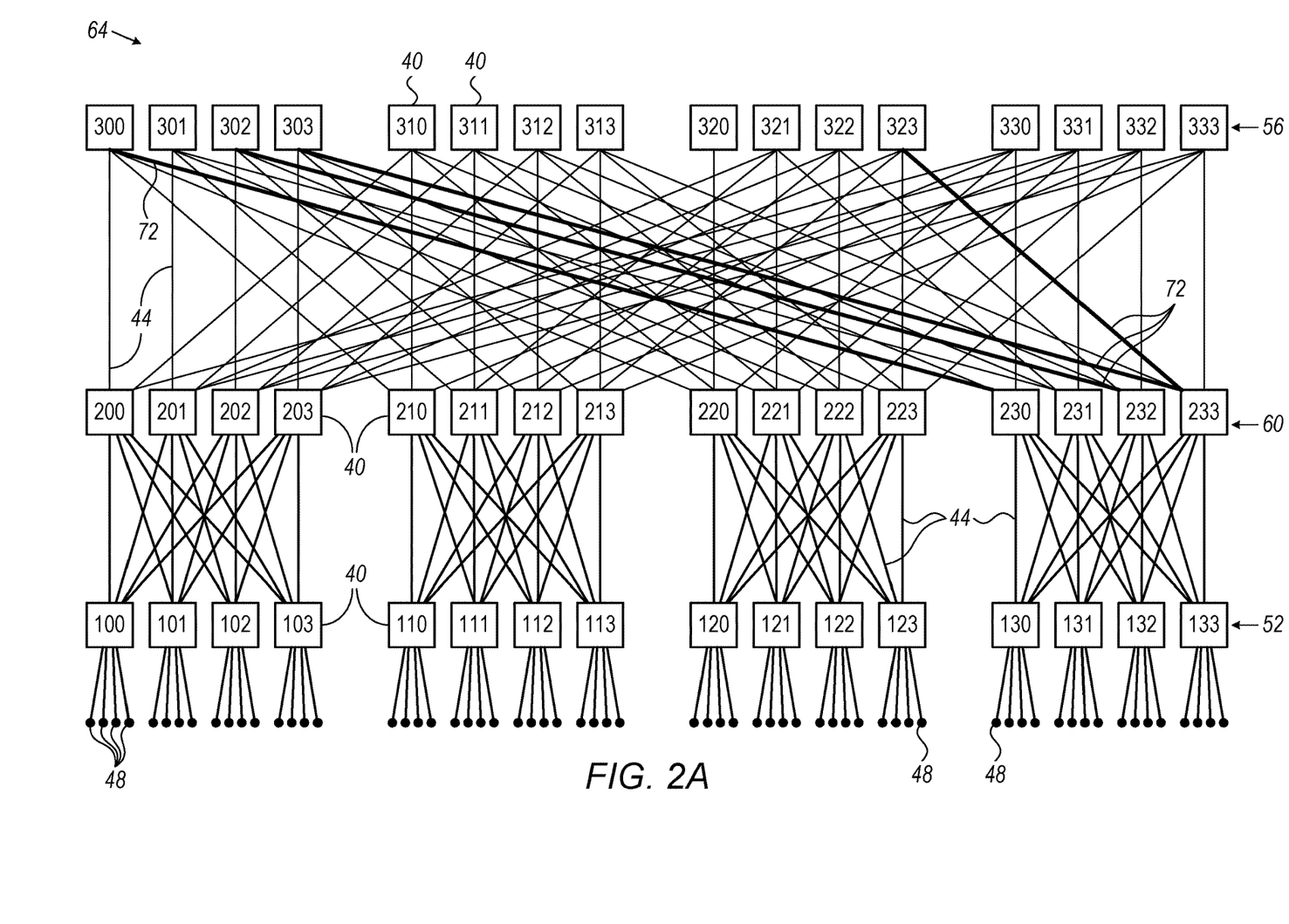
FIG. 2A is a diagram that schematically illustrates a FT network with faulty links, in accordance with an embodiment of the present invention.

FIG. 2A is a diagram that schematically illustrates a FT network 64, in accordance with an embodiment of the present invention. In the present example, network 64 comprises a total of forty-eight switches 40 arranged in three levels—Leaf level 52, spine level 56 and intermediate level 60. Each switch is numbered using a three-digit index in which:

The first digit denotes the level to which the switch belongs (1—leaf, 2—intermediate, 3—spine).
The second digit denotes a subset, within the level, to which the switch belongs (subset 0 through subset 3).
The third digit is an index of the individual switch within the subset (switch 0 through switch 3).

Any FT network, with network 64 of FIG. 2A being a non-limiting but demonstrative example, can be viewed as comprising multiple bottom-to-top sub-trees. Each bottom-to-top sub-tree begins (i.e., has its root) at one of the leaf switches and extends upwards via intermediate level 60 toward spine level 56. For example, bottom-to-top the sub-tree beginning at leaf switch "110" includes switches "210"-"213" in intermediate level 60, and all spine switches in spine level 56. Similarly, the bottom-to-top sub-tree beginning at leaf switch "123" includes switches "220"-"223" in intermediate level 60, and all spine switches in spine level 56. A path from one leaf switch ("source switch") to another leaf switch ("destination switch") first traverses upwards within the bottom-to-top sub-tree of the source switch, and then traverses downwards within the bottom-to-top sub-tree of the destination switch. Some paths reach spine level 56 (e.g., paths from switch "100" to switch "122"). Other paths (e.g., paths from switch "100" to switch "103") only reach intermediate level 60.

As can be seen in the example of FIG. 2A, FT networks possess considerable redundancy, in that every pair of hosts 48 can communicate over multiple alternative paths (each path traversing multiple links 44 and one or more switches 40). In addition to redundancy, the multiple alternative paths also increase the available bandwidth, since traffic can be distributed among them in parallel. Faulty links in the network reduce the level of redundancy and also reduce the available bandwidth over at least part of the network.

Over time, some of links 44 may fail. As noted above, the actual impact of faulty links on the network performance depends not only on their number, but also on the way they are distributed in the FT topology. For example, faulty links that are scattered evenly across the network will typically have a lesser effect than faulty links that are concentrated in a particular region or sub-tree.

In the example of FIG. 2A, network 64 comprises four faulty links (marked in bold and numbered 72 in the figure).

By coincidence, in this example all four faulty links belong to the same bottom-to-top sub-tree (any of the bottom-to-top sub-trees stemming from switch "130", "131", "132" or "133" is affected by all four faulty links 72). This distribution typically has a worse effect on the available bandwidth, relative to a scenario in which each faulty link belongs to a different sub-tree.

As can be appreciated, information as to the distribution of faulty links 72 is valuable for managing network 64. In some embodiments, processor 36 of NMS 20 calculates and reports one or more figures-of-merit for the network conveying this information. The figures-of-merit are based on oversubscription ratios calculated for groups of switches 40, as explained below.

Figure 2B:
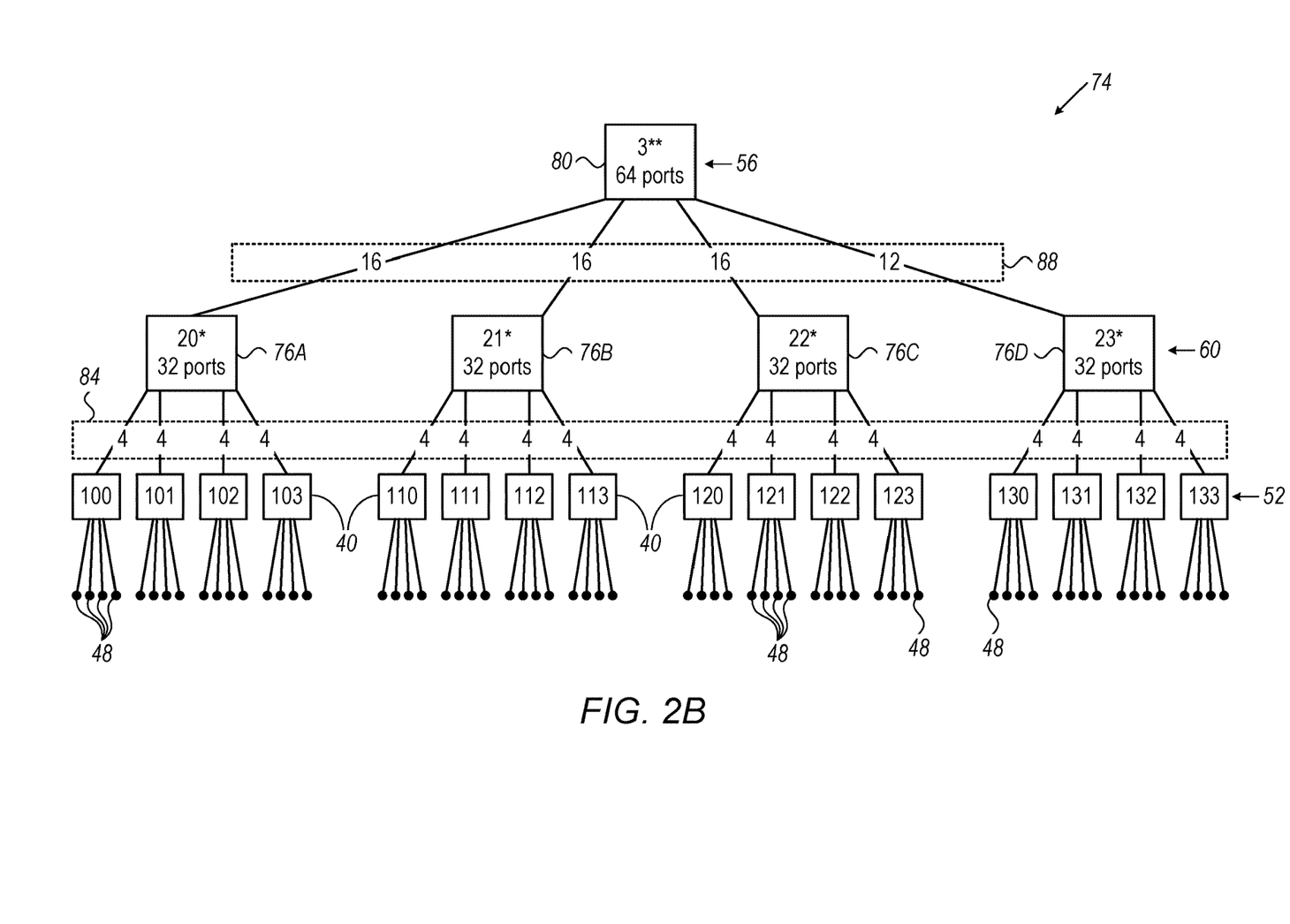
FIG. 2B is a diagram that schematically illustrates an alternative representation of the FT network of FIG. 2A, used for calculation of oversubscription ratios, in accordance with an embodiment of the present invention.

FIG. 2B is a diagram that schematically illustrates an alternative representation 74 of FT network 64 of FIG. 2A, used for calculation of oversubscription ratios, in accordance with an embodiment of the present invention. In this representation, spine level 56 is represented by a single group 80.

In addition, the sixteen switches of intermediate level 60 have been grouped into four groups of four switches each:

A group 76A comprises switches "200", "201", "202" and "203" (denoted jointly "20*").
A group 76B comprises switches "210", "211", "212" and "213" (denoted jointly "21*").
A group 76C comprises switches "220", "221", "222" and "223" (denoted jointly "22*").
A group 76D comprises switches "230", "231", "232" and "233" (denoted jointly "23*").

This partitioning into groups 76A-76D is not arbitrary, but rather selected such that each group comprises the intermediate switches that belong to the same bottom-to-top sub-tree. Another way to view this partitioning is that the switches in a given group, with the leaf switches they are connected to, together form a bipartite network (see FIG. 2A).

In addition, leaf level 52 is partitioned into sixteen groups, each group containing a single leaf switch.

In an example embodiment, the following grouping process is used, for any level:

consider all switches in level j that connect to a corresponding set of switches in level j+1 (the next-higher level toward the spine level).
If a given switch in level j is not connected to a set of switches $U_{j+1}$ in level j+1, but the given switch is connected a set of switches $G_{j+1}$ in level j+1, and other switches in level j connect to both $U_{j+1}$ (or to a subset thereof) and to $G_{j+1}$, then the combined set of switches Union($U_{j+1}$, $G_{j+1}$) in level j+1 is considered the same group.

In alternative embodiments, any other suitable partitioning into groups can be used. In some embodiments processor 36 chooses the appropriate partitioning. In other embodiments the partitioning is predefined.

In the present example, each of groups 76A-76D has a total of thirty-two ports connected to thirty-two respective links. In each of groups 76A-76B, sixteen links are downward links connecting downwards to leaf level 52, and sixteen links are upward links connecting upwards to spine level 56.

The downward links of intermediate level 60 are denoted 84 in the figure, and the upward links are denoted 88. The figure also depicts the number (count) of functional (operational) upward links and the number of functional downward links, per group. In the present example (see FIG. 2A), the network has four faulty links 72, all four being upward links belonging to group 76D.

In some embodiments, processor 36 calculates a respective oversubscription ratio for each of groups 76A-76D of intermediate level 60. The oversubscription ratio of a group is defined as the ratio between (i) the total available bandwidth on the upward links of the group and (ii) the total available bandwidth on the downward links of the group. In practice, assuming the links are of equal bandwidth, processor 36 approximates the oversubscription ratio of a group by calculating the ratio between the number of functional (i.e., operational, as opposed to faulty) upward links and the number of functional downward links.

In the example of FIGS. 2A and 2B, each of groups 76A-76C has an oversubscription ratio of 16/(4+4+4+4)=1. Group 76D, which comprises the four faulty upward links, has an oversubscription ratio of 12/(4+4+4+4)=0.75.

The list of four oversubscription ratios ({1,1,1,0.75} for groups 76A-76D) conveys considerably more valuable information than the mere count of faulty links. For example, the oversubscription ratios show that the faulty links are concentrated in a single group of switches corresponding to a single bottom-to-top sub-tree.

In various embodiments, processor 36 may calculate (and report to operator 24) various figures-of-merit for the FT network based on the oversubscription ratios. Several non-limiting examples of figures-of-merit comprise:

The complete list of oversubscription ratios.
The maximal oversubscription ratio among the oversubscription ratios.
The minimal oversubscription ratio among the oversubscription ratios.
An average of the oversubscription ratios.

In some embodiments, processor 36 calculates the oversubscription ratios and the corresponding figures-of-merit at various points in time. In this manner, as links fail and/or are remediated, processor 36 may track and report trends that show the actual impact of faulty links as a function of time.

The example depicted in FIGS. 2A and 2B is a non-limiting example that is chosen purely for the sake of conceptual clarity. In alternative embodiments, any other suitable oversubscription-based scheme can be used. For example, when the FT network comprises multiple intermediate levels, processor 36 may calculate oversubscription ratios for any intermediate level, or for multiple intermediate levels. The chosen intermediate level may be the level immediately above leaf level 52, but not necessarily.

As another example, the leaf level can also be partitioned into groups. In this embodiment, each group of leaf switches typically comprises a single leaf switch. For each leaf switch (considered a group in this embodiment), processor 36 may calculate an oversubscription ratio between (i) the available bandwidth over the upward links (connecting the leaf switch to the intermediate level immediately above the leaf level) and (ii) the available bandwidth over the downward links (connecting the leaf switch to the hosts 48 served by the leaf switch).

Figure 3:
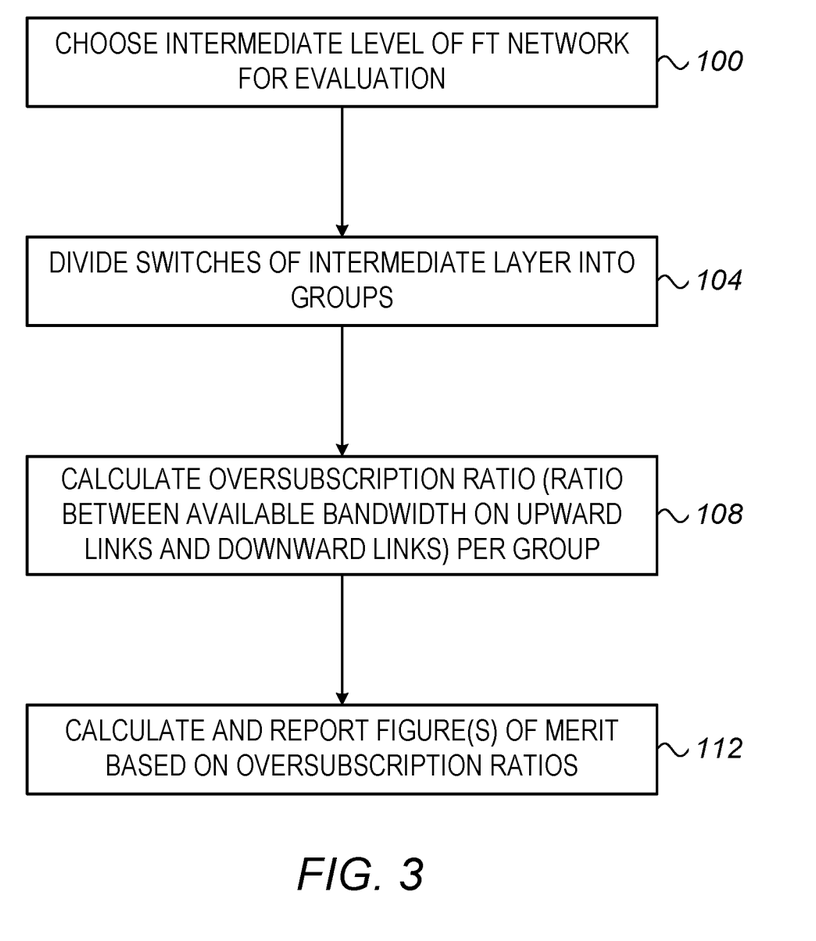
FIG. 3 is a flow chart that schematically illustrates a method for evaluating bandwidth metrics for a FT network based on oversubscription ratios, in accordance with an embodiment of the present invention.

FIG. 3 is a flow chart that schematically illustrates a method for evaluating bandwidth metrics for a FT network based on oversubscription ratios, in accordance with an embodiment of the present invention. The method begins with processor 36 of NMS 20 choosing an intermediate level for evaluation, at a level selection stage 100. This stage is relevant to cases in which the FT network has more than one intermediate level. If, as in the example of FIGS. 2A and 2B, the network has only one intermediate level, stage 100 is degenerate.

At a partitioning stage 104, processor 36 divides the switches of the chosen intermediate level into multiple groups. As noted above, in some embodiments the partitioning into groups is predefined, e.g., preconfigured in the software of processor 36.

At an oversubscription ratio calculation stage 108, processor 36 calculates a respective oversubscription ratio for each group of switches. At a figure-of-merit calculation, processor 36 calculates one or more figures-of-merit for the FT network, based on the oversubscription ratios. Processor 36 reports the figure(s)-of-merit to operator 24.

Although the embodiments described herein mainly address estimation of the impact of link faults on the bandwidth provided by a FT network, establishing the order of importance in fixing links, etc., the methods and systems described herein can also be used in other applications, such as in job placement in the hosts served by the network, e.g., for avoiding placing jobs across sub-trees with high oversubscription.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for bandwidth estimation, the system comprising:
   an interface, to communicate with a fat-tree (FT) network comprising:
      a plurality of switches comprising (i) multiple leaf switches belonging to a bottom level, (ii) multiple spine switches belonging to a top level and (iii) multiple intermediate switches belonging to one or more intermediate levels between the top level and the bottom level; and
      multiple links connecting between selected ones of the switches; and
   a processor, to:
      for a given level of the FT network that is divided into multiple groups of switches, calculate one or more oversubscription ratios for one or more of the groups, respectively, an oversubscription ratio of a group being indicative of a ratio between (i) a first available bandwidth on the links connecting the switches in the group to a lower level, and (ii) a second available bandwidth on the links connecting the switches in the group to a higher level; and
      calculate, based on the one or more oversubscription ratios, a figure of merit that, for a given number of faulty links identified in the FT network, quantifies an impact of a distribution of the given number of faulty links across the FT network on a performance of the FT network.

2. The system according to claim 1, wherein the processor is to approximate the oversubscription ratio of a given group by calculating a ratio between (i) a first number of operational links connecting the switches in the given group to the lower level, and (ii) a second number of operational links connecting the switches in the given group to the higher level.

3. The system according to claim 1, wherein the given level is an intermediate level immediately above the bottom level.

4. The system according to claim 3, wherein each of the groups, together with the leaf switches connected thereto, forms a bipartite network.

5. The system according to claim 1, wherein the FT network comprises multiple bottom-to-top sub-trees, each of the bottom-to-top sub-trees extending from a respective leaf switch toward the top level, and wherein each group comprises the switches in the given level that belong to a same bottom-to-top sub-tree.

6. The system according to claim 1, wherein the figure-of-merit comprises one or more of (i) a maximum of the oversubscription ratios, (ii) a minimum of the oversubscription ratios and (iii) an average of the oversubscription ratios.

7. A method for bandwidth estimation in a fat-tree (FT) network that includes a plurality of switches including (i) multiple leaf switches belonging to a bottom level, (ii) multiple spine switches belonging to a top level and (iii) multiple intermediate switches belonging to one or more intermediate levels between the top level and the bottom level, the FT network further including multiple links connecting between selected ones of the switches, the method comprising:

for a given level of the FT network that is divided into multiple groups of switches, calculating one or more oversubscription ratios for one or more of the groups, respectively, an oversubscription ratio of a group being indicative of a ratio between (i) a first available bandwidth on the links connecting the switches in the group to a lower level, and (ii) a second available bandwidth on the links connecting the switches in the group to a higher level; and calculating, based on the one or more oversubscription ratios, a figure of merit that, for a given number of faulty links identified in the FT network, quantifies an impact of a distribution of the given number of faulty links across the FT network on a performance of the FT network.

8. The method according to claim 7, wherein calculating the oversubscription ratios approximating the oversubscription ratio of a given group by calculating a ratio between (i) a first number of operational links connecting the switches in the given group to the lower level, and (ii) a second number of operational links connecting the switches in the given group to the higher level.

9. The method according to claim 7, wherein the given level is an intermediate level immediately above the bottom level.

10. The method according to claim 9, wherein each of the groups, together with the leaf switches connected thereto, forms a bipartite network.

11. The method according to claim 7, wherein the FT network comprises multiple bottom-to-top sub-trees, each of the bottom-to-top sub-trees extending from a respective leaf switch toward the top level, and wherein each group comprises the switches in the given level that belong to a same bottom-to-top sub-tree.

12. The method according to claim 7, wherein the figure of merit comprises one or more of (i) a maximum of the oversubscription ratios, (ii) a minimum of the oversubscription ratios and (iii) an average of the oversubscription ratios.

* * * * *